United States Patent
Narendra

(10) Patent No.: US 11,567,163 B2
(45) Date of Patent: Jan. 31, 2023

(54) MOBILE DEVICE LOCATIONING

(71) Applicant: ZEBRA TECHNOLOGIES CORPORATION, Lincolnshire, IL (US)

(72) Inventor: Patrenahalli M. Narendra, Hoffman Estates, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 113 days.

(21) Appl. No.: 17/224,914

(22) Filed: Apr. 7, 2021

(65) Prior Publication Data

US 2022/0326336 A1 Oct. 13, 2022

(51) Int. Cl.
*G01S 5/00* (2006.01)
*G01S 5/02* (2010.01)
*H04L 43/0864* (2022.01)

(52) U.S. Cl.
CPC ............ *G01S 5/021* (2013.01); *G01S 5/0295* (2020.05); *H04L 43/0864* (2013.01)

(58) Field of Classification Search
CPC ..... G01S 5/021; G01S 5/0295; H04L 43/0864
See application file for complete search history.

(56) References Cited

U.S. PATENT DOCUMENTS 11,024,079 B1 * 6/2021 Chuah .................... G06T 7/246
2014/0016821 A1   1/2014 Arth et al.
2015/0092048 A1 * 4/2015 Brunner .................... G06T 7/80
                                                                  348/135
2016/0066157 A1 * 3/2016 Noorshams ........... H04W 4/023
                                                                  455/457
2020/0034721 A1 * 1/2020 Narendra .............. H04W 4/023
2020/0267365 A1 * 8/2020 Hiroi ...................... G06T 15/20
2021/0097739 A1 * 4/2021 Xie ......................... G06T 7/20

OTHER PUBLICATIONS

International Search Report and Written Opinion for International Application No. PCT/US2022/016691 dated Jun. 2, 2022.

* cited by examiner

*Primary Examiner* — Khai M Nguyen

(57) ABSTRACT

A mobile computing device includes: a tracking sensor; a proximity sensor; and a controller coupled to the tracking sensor and the proximity sensor, the controller configured to: obtain a sequence of sensor datasets, each sensor dataset including: (i) a location of the mobile computing device, in a local coordinate system, generated using the tracking sensor, (ii) a proximity indicator generated using the proximity sensor, defining a range to a fixed reference device, and (iii) a predefined location of the reference device in a facility coordinate system; determine, from the sequence, an adjusted pose of an origin of the local coordinate system in the facility coordinate system; and generate, using a current location of the mobile device in the local coordinate system and the adjusted pose, a corrected location of the mobile computing device in the facility coordinate system; and execute a control action based on the corrected location.

22 Claims, 12 Drawing Sheets

MOBILE DEVICE LOCATIONING

BACKGROUND

Mobile computing devices may be deployed in a wide variety of environments to perform tasks that rely at least in part on the location of the devices. For example, a mobile device may be carried by a warehouse worker and provide instructions to the worker to retrieve items in the warehouse, selected based on the current location of the device and the location of such items.

The above environments may impede the use of locationing technologies such as the global positioning system (GPS) by the devices, e.g. when the operating environment is indoors. Locationing techniques suitable for indoor use may also be subject to interference and/or other sources of error, which may reduce the accuracy thereof. Those techniques may therefore be insufficiently precise, and/or may lack the ability to detect a device orientation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
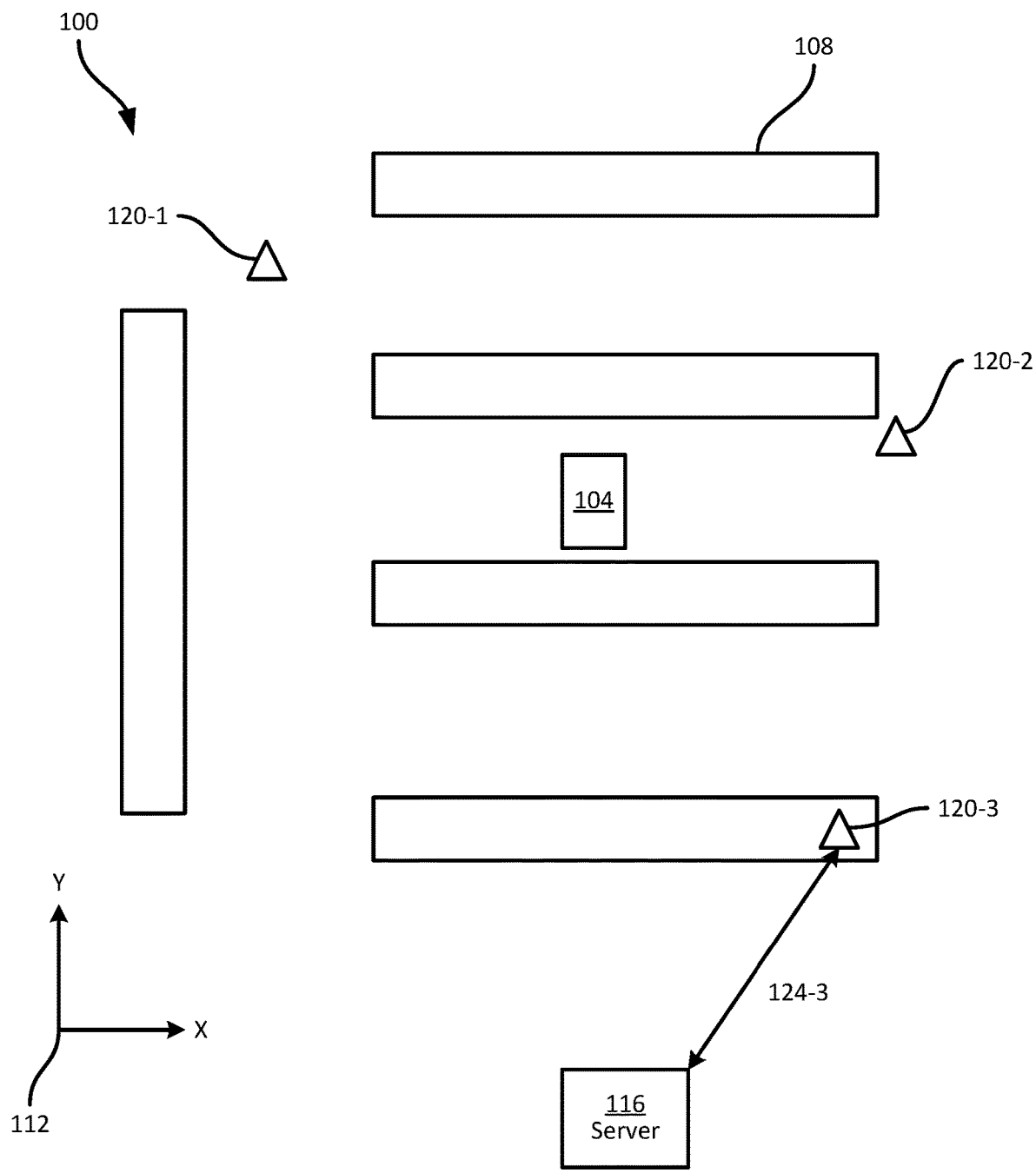
FIG. 1 is a diagram of a facility with a mobile device locationing system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to mobile computing device including: a tracking sensor; a proximity sensor; and a controller coupled to the tracking sensor and the proximity sensor, the controller configured to: obtain a sequence of sensor datasets, each sensor dataset including: (i) a location of the mobile computing device, in a local coordinate system, generated using the tracking sensor, (ii) a proximity indicator generated using the proximity sensor, defining at least one of a range or a bearing angle to a fixed reference device, and (iii) an identifier indicative of a predefined location of the reference device in a facility coordinate system; determine, from the sequence, an adjusted pose of an origin of the local coordinate system in the facility coordinate system; and generate, using a current location of the mobile device in the local coordinate system and the adjusted pose, a corrected location of the mobile computing device in the facility coordinate system; and execute a control action based on the corrected location Additional examples disclosed herein are directed to a method including: obtaining a sequence of sensor datasets at a mobile computing device having a tracking sensor and a proximity sensor, each sensor dataset including: (i) a location of the mobile computing device, in a local coordinate system, generated using the tracking sensor, (ii) a proximity indicator generated using the proximity sensor, defining at least one of a range or a bearing angle to a fixed reference device, and (iii) an identifier indicative of a predefined location of the reference device in a facility coordinate system; determining, from the sequence, an adjusted pose of an origin of the local coordinate system in the facility coordinate system; and generating, using a current location of the mobile device in the local coordinate system and the adjusted pose, a corrected location of the mobile computing device in the facility coordinate system; and executing a control action based on the corrected location.

Further examples disclosed herein are directed to a non-transitory computer-readable medium storing instructions executable by a controller of a mobile device having a tracking sensor and a proximity sensor, execution of the instructions causing the controller to: obtain a sequence of sensor datasets, each sensor dataset including: (i) a location of the mobile computing device, in a local coordinate system, generated using the tracking sensor, (ii) a proximity indicator generated using the proximity sensor, defining at least one of a range or a bearing angle to a fixed reference device, and (iii) an identifier indicative of a predefined location of the reference device in a facility coordinate system; determine, from the sequence, an adjusted pose of an origin of the local coordinate system in the facility coordinate system; and generate, using a current location of the mobile device in the local coordinate system and the adjusted pose, a corrected location of the mobile computing device in the facility coordinate system; and execute a control action based on the corrected location.

FIG. 1 illustrates an overhead view of a facility 100 in which a mobile computing device 104 (also referred to simply as the device 104) is deployed. The facility 100 can include, for example, a retail facility, a warehouse, or the like, containing a plurality of support structures 108 such as shelves, tables or the like supporting items. Workers (e.g. human workers, autonomous or semi-autonomous devices, or the like) may travel the facility to place items on the support structures and or retrieve items from the support structures. Each worker may be equipped with a mobile computing device such as the device 104. The device 104 can take a variety of forms, including a smart phone, a wearable computer, a tablet computer, or the like.

The device 104 can be configured to perform various actions related to the placement and retrieval of items on or from the support structures 108, and/or related to other activities carried out by the worker operating the device 104. For example, in the context of retrieving and placing items from or on the support structures 108, the device 104 can present directional guidance to the worker, indicating a location of an item to be retrieved, a location for an item to be placed, or the like. To provide such directional guidance, the device 104 is configured to track its own location in the facility 100, e.g. according to a facility coordinate system 112 previously established in the facility 100. The device 104 may also periodically report its current location, e.g. to a server 116 via a network such as a wireless area network (WAN) or a wireless local area network (WLAN). The WLAN may be implemented by a set of wireless access points (APs) 120-1, 120-2, 120-3 deployed throughout the facility 100 and connected to the server 116 (or other network equipment, such as a router) via links such as the link 124-3 shown in connection with the access point 120-3.

The server 116 and/or the device 104 can maintain a map of the facility 100, including locations of the support structures 108 in the coordinate system 112, enabling the presentation of device location, item locations and the like overlaid on the map.

Thus, various tasks performed by the device 104 may require knowledge of the current location of the device 104 in the coordinate system 112. Certain locationing technologies, such as the global positioning system (GPS), may not be available to the device 104, however. For example, the facility 100 may be an indoor facility, and/or may include metal structures (such as the support structures 108) substantial enough to interfere with GPS signals. The device 104 is therefore configured to implement locationing techniques suitable for indoor use. As will be discussed below in greater detail, the device 104 is configured to combine distinct locationing techniques to increase one or both of the consistency and accuracy of the resulting location tracking, in comparison with the consistency and/or accuracy obtained by either technique alone.

Figure 2:
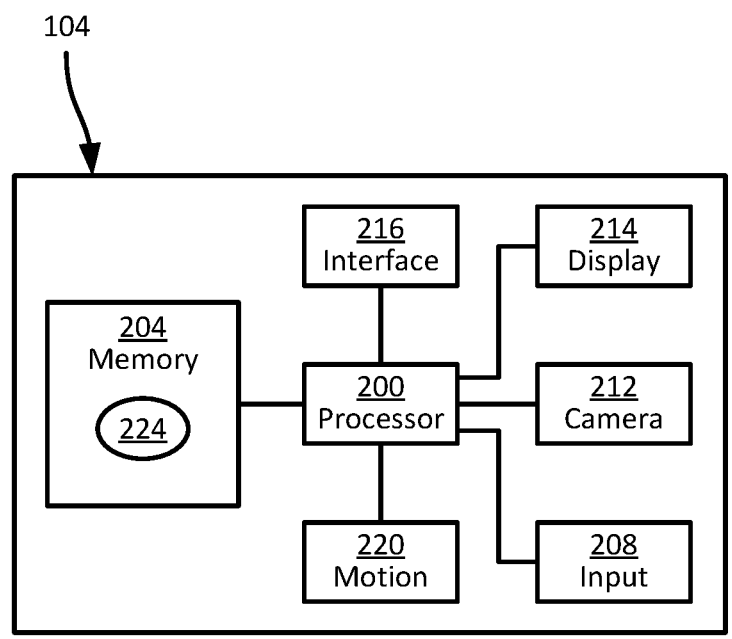
FIG. 2 is a block diagram of certain internal hardware components of the mobile computing device of FIG. 1.

Turning to FIG. 2, certain internal components of the device 104 are shown. The device 104 includes a processor 200 (e.g. one or more central processing units), interconnected with a non-transitory computer readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 104 also includes at least one input device 208 interconnected with the processor 200. The input device 208 is configured to receive input (e.g. from an operator of the device 104) and provide data representative of the received input to the processor 200. The input device 208 includes any one of, or a suitable combination of, a touch screen integrated with the display 124, a keypad, a microphone, or the like.

The device 104 also includes a camera 212 including a suitable image sensor or combination of image sensors including a Time of Flight sensor, stereoscopic cameras and the like. The camera 212 is configured to capture a sequence of images (e.g. a video stream) for provision to the processor 200 and subsequent processing. The subsequent processing can include the use of the images to track a pose of the device 104, via one of the above-mentioned locationing techniques. The device 104 can also include an output assembly, such as a display 214, which can include any suitable display panel or combination of display panels. In some examples the display 214 can be integrated with the input 208, e.g. in the form of a touch screen. The device 104 can also include other output assemblies, such as a speaker, a notification LED, and the like (not shown). The device 104 also includes a communications interface 216 enabling the device 104 to communicate with other computing devices, such as the server 116, via the APs 120. The interface 216 therefore includes a suitable combination of hardware elements (e.g. transceivers, antenna elements and the like) and accompanying firmware to enable such communication.

The communications interface 216 may also be referred to as a proximity sensor herein, as the communications interface 216 can be configured to generate proximity indicators based on the signal strength and/or other properties of wireless signals detected by the communications interface 216. For example, the communications interface 216 can detect beacons or other signals periodically emitted by the APs 120, containing at least an identifier of the relevant AP 120, and generate a received signal strength indicator (RSSI) or other proximity indicator that corresponds to a distance between the device 104 and the AP 120. As will now be apparent, the APs 120 may be replaced by, or supplemented with, other wireless emitters, such as Bluetooth Low Energy (BLE) beacon devices, ultra-wideband (UWB) devices, or the like, and the communications interface 216 can be configured to detect signals emitted by such beacon devices, and generate the above-mentioned proximity indicators. In further examples, the reference devices can include magnetic beacons such as passive magnets or active, powered magnets, and the proximity sensor of the device 104 can be implemented as a magnetometer. Magnetic emitters can have distinct magnetic signatures from one another, enabling the device 104 to distinguish between reference devices in a manner similar to distinguishing between APs 120 via AP identifiers. More generally, the APs 120 and/or BLE beacons or other suitable emitters may be referred to as reference devices, and the device 104 includes a proximity sensor (e.g. the interface 216) configured to detect signals from such reference devices and generate proximity indicators that correspond to a range between the device 104 and a reference device. The proximity indicators may be generated from signal strength measurements, time-of-flight measurements, or the like.

Further, the device 104 includes a motion sensor 220 for use in tracking the pose of the device 104. The motion sensor 220 can include an inertial measurement unit (IMU) including one or more accelerometers, one or more gyroscopes, and/or one or more magnetometers. The motion sensor 220 can also include a depth sensor, such as a depth camera, a lidar sensor, or the like. Data collected by the motion sensor 220 is processed, in some examples along with images from the camera 212, to determine a current pose of the device 104. More generally, the device 104 is said to include a tracking sensor, which can be implemented by either of the motion sensor 220 and the camera 212, or by a combination of the motion sensor 220 and the camera 212.

The memory 204 stores computer readable instructions for execution by the processor 200. In particular, the memory 204 stores a locationing application 224 (also referred to simply as the application 224) which, when executed by the processor 200, configures the processor 200 to perform various functions discussed below in greater detail and related to the tracking of the pose of the device 104 using a combination of locationing techniques, to generate poses (i.e. locations and orientations) of the device 104 in the coordinate system 112. The application 224 may also be implemented as a suite of distinct applications in other examples. Those skilled in the art will appreciate that the functionality implemented by the processor 200 via the execution of the application 224 may also be implemented by one or more specially designed hardware and firmware components, such as FPGAs, ASICs and the like in other embodiments.

Figure 3:
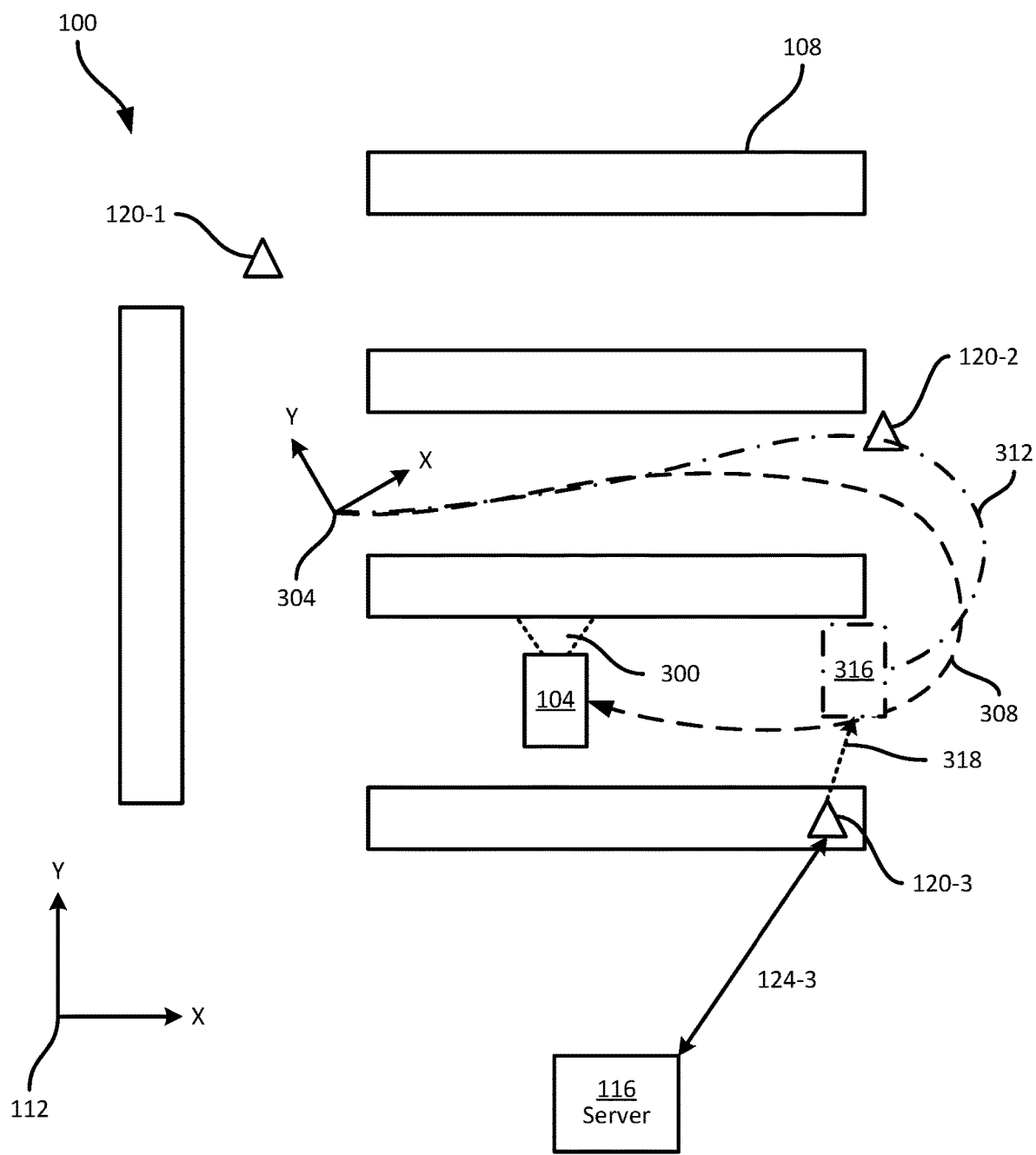
FIG. 3 is a diagram illustrating sensor drift in the facility of FIG. 1.

Turning to FIG. 3, an example locationing technique employed by the device 104 is illustrated. In particular, the processor 200 can control the tracking sensor mentioned above (e.g. the camera 212 and the motion sensor 220) to capture data representing the surroundings of the device 104, as well as motion of the device 104. For example, images captured by the camera 212 depict various features of the surroundings of the device 104, such as a portion of a support structure 108 that falls within a field of view 300 of the camera 212. The processor 200 detects one or more image features in the images from the camera 212, such as gradient changes, edges, corners, and the like. Features can be detected via various suitable feature-detection algorithms. The processor 200 then tracks the changes in position of such features between successive images. The movement of the features between images, along with motion data such as acceleration and orientation change detected by the motion sensor 220, is indicative of movement of the device 104.

The positions of the above-mentioned features, as well as motion data from the motion sensor 220, can be provided as inputs to a pose estimator implemented by the processor 200, such as a Kalman filter. Various mechanisms will occur to those skilled in the art to combine image and/or motion sensor data to generate pose estimations. Examples of such mechanisms include those implemented by the ARCore software development kit provided by Google LLC, and the ARKit software development kit provided by Apple Inc.

The above pose tracking technique generates a sequence of poses of the device 104 relative to an arbitrary local coordinate system 304, which is created by the device 104 when pose tracking begins. That is, the local coordinate system 304 may be generated at an initial pose of the device 104, and the pose of the device in the local coordinate system 304 is tracked as the device travels, e.g. along a path 308 to a current position. The pose of the origin of the system 304 in the facility coordinate system 112 is not predetermined, and may therefore be unknown to the device 104. In other words, although the device 104 may track its pose in the local coordinate system 304, the device 104 may be dependent on further information to transform the tracked poses into the facility coordinate system.

In addition, the pose tracking mentioned above may be vulnerable to sensor drift. That is, while errors introduced between adjacent pose estimates may be small, over time such errors may accumulate to the point that the estimated pose of the device 104 in the local coordinate system no longer accurately represents the pose of the device 104 within the facility 100. An exaggerated example of such drift is illustrated in FIG. 3. In particular, the path 308 mentioned above is the path represented by successive tracked poses of the device 104 in the local coordinate system 304. However, the true path travelled by the device 104 is shown as a path 312, which deviates over time from the measured path 308. As a result, the current pose of the device 104 is measured as shown in solid lines in FIG. 3, while the true current pose of the device 104 is the pose 316, which is sufficiently distant from the measured pose as to render the measured pose inadequate for at least some control actions that the device 104 performs based on location.

To discover the relation between the local coordinate system 304 and the facility coordinate system 112, and to counteract the drift mentioned above, the device 104 is configured to implement a second locationing technique simultaneously with the technique shown in FIG. 3. In particular, the device 104 is configured, using the communications interface 216 or other suitable proximity sensor, to detect a signals emitted by the APs 120 or other suitable reference devices as noted above. An example signal 318 emitted by the AP 120-3 is shown in FIG. 3. As will be apparent, the signal 318 is detected by the device 104 at the true position 316 of the device 104. Based on the detected signal, the device 104 can generate a proximity indicator corresponding to a range between the device 104 and the AP 120-3. The fixed locations of the APs 120 in the facility coordinate system 112 are available to the device 104, either in the memory 204 or via the server 116. When multiple ranges are available, the device 104 may triangulate its current location according to the predefined locations of the relevant APs 120. However, at any given time, the device 104 may detect too few signals to permit such triangulation. Further, the signals from the APs 120 or other reference devices may be affected by interference, multi-path artifacts, and the like, which can result in inaccurate proximity indicators (e.g. inaccurate estimates of the range between the device 104 and the relevant AP 120). The proximity indicators are not, however, vulnerable to the sensor drift noted above in connection with the image and motion-based locationing technique. Stated another way, the feature-based locationing using the camera 212 and motion sensor 220 may be subject to low-frequency error in the form of drift, while the proximity-based locationing may be subject to high-frequency noise, but experiences little or no low-frequency drift.

The device 104 is therefore configured to combine aspects of feature-based locationing and proximity-based locationing to counteract the effect of sensor drift, while maintaining the ability of feature-based locationing to generate pose estimates with lower levels of noise than proximity-based locationing.

Figure 4:
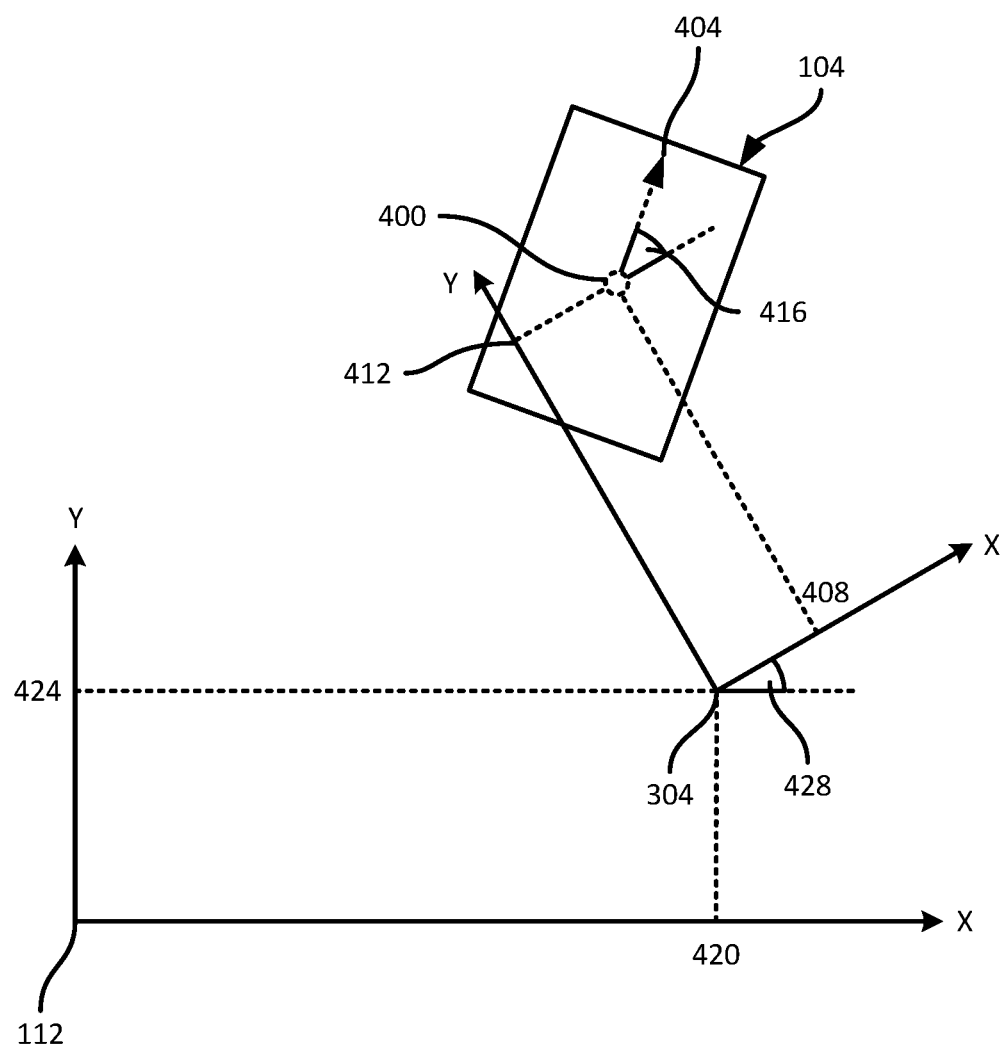
FIG. 4 is a diagram illustrating pose tracking by the mobile device of FIGS. 1 and 2.

Referring to FIG. 4, the device 104 is shown in isolation, to illustrate the representation of a pose of the device 104 according to the two distinct coordinate systems 112 and 304. The pose of the device 104 is defined by a location 400, and an orientation 404, both of which are determined in the local coordinate system 304, via the feature-based locationing technique using the above-mentioned tracking sensor.

The location 400 represents the location of a centroid of the device 104 in the local coordinate system 304. In other embodiments, the location 400 can correspond to a different point of the device 104. The location 400 is therefore defined by an X coordinate 408 in the local coordinate system 304, a Y coordinate 412 in the local coordinate system 304, and an angle in the XY plane, e.g. an angle 416 relative to the X axis of the local coordinate system 304. As will be apparent, the local coordinate system 304 and the facility coordinate system 112 may be three-dimensional systems, and the pose of the device 104 may therefore be defined with an additional coordinate and two additional angles. However, in this example the vertical dimension is omitted for simplicity of illustration.

To make use of the pose of the device 104 for providing directional guidance or other functions within the facility 100, the pose may be transformed to a pose in the facility coordinate system 112. Such a transformation includes applying a translation and/or a rotation to the pose in the local coordinate system 304. The transformation is defined by the pose of the origin of the local coordinate system 304 within the facility coordinate system 112. The origin of the local coordinate system 304 has a pose defined by X and Y coordinates 420 and 424, respectively, in the facility coordinate system 112, as well as an angle 428, e.g. relative to the X axis of the facility coordinate system 112.

As will be apparent in the discussion below, the transformation between coordinate systems 112 and 304 may initially be unknown as the local coordinate system 304 is generated arbitrarily by the device 104. Further, even when the above transformation is discovered (i.e. once the coordinates 420 and 424, and the angle 428, are available to the device 104), sensor drift may result in the coordinates 408 and 412 and the angle 416 no longer accurately defining the true position of the device 104 once transformed via the coordinates 420 and 424, and the angle 428. The device 104 is therefore configured to periodically adjust or update the pose of the origin of the local coordinate system 304 within the facility coordinate system 112, to counteract sensor drift.

Figure 5:
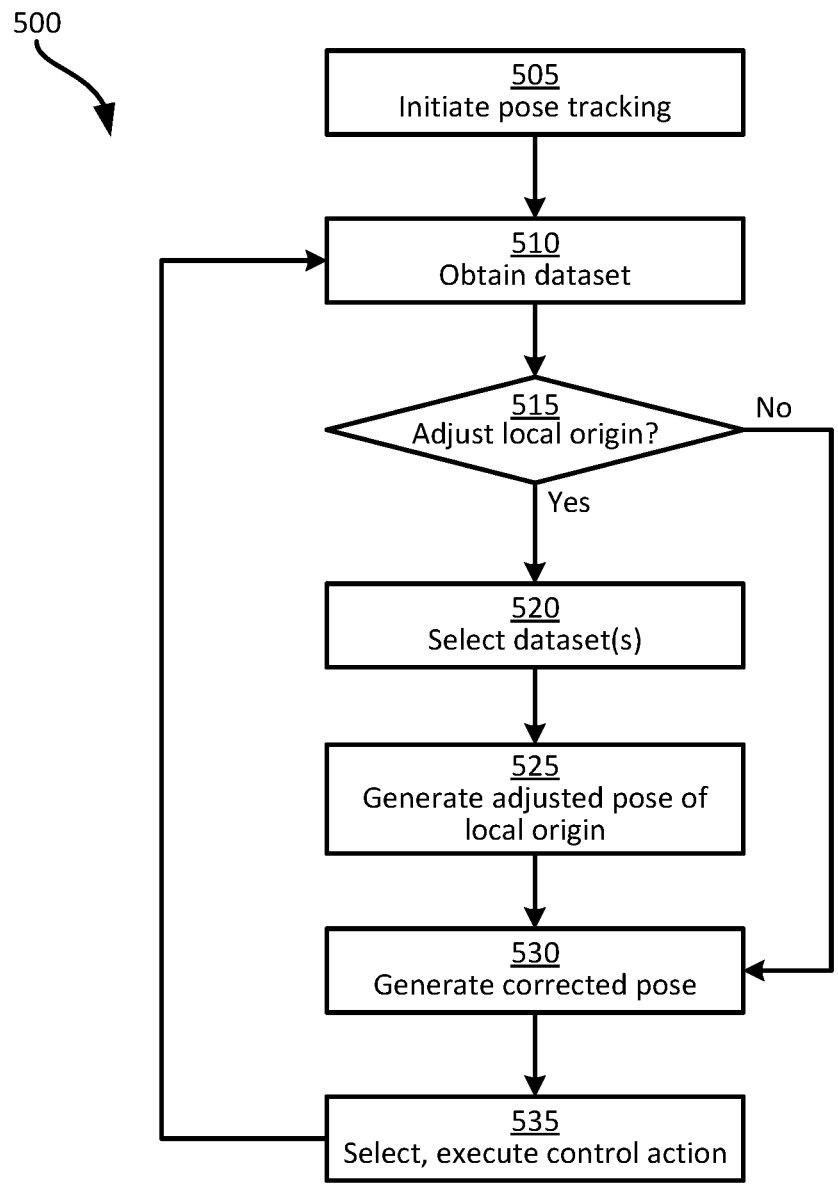
FIG. 5 is a flowchart of a method of sensor drift compensation in mobile device locationing.

Turning to FIG. 5, a method 500 of sensor drift compensation is illustrated. The method 500 will be described in conjunction with its performance by the device 104. However, in some examples, certain processing involved in the method 500 may be off-loaded to the server 116, e.g. depending on the computational capabilities of the device 104.

At block 505, the device 104 is configured to initiate pose tracking. Specifically, at block 505 the device 104 creates the local coordinate system 304, e.g. with an origin at the current location 400 of the device 104 and a Y axis aligned with the current orientation 404 of the device 104. The pose of the local coordinate system 304 relative to the facility coordinate system 112 is, in this example, not yet known. Initiation of pose tracking at block 505 occurs in response to execution of the application 224, e.g. in response to an input from the operator of the device 104, a command from the server 116, or the like.

To initiate pose tracking, the processor 200 controls the tracking sensor (e.g. the camera 212 and the motion sensor 220, in this example) to begin capturing a stream of images and/or motion data. As discussed earlier, the captured data is employed to track a current pose of the device 104 in the local coordinate system 304. Pose tracking, once initiated at block 505, continues throughout the remainder of the method 500. The frequency with which new pose estimates are generated by the device 104 varies, for example with the computational resources available to the device 104, the frame rate of the camera 212, and the like. For example, the device 104 may generate pose estimates at a frequency of about 30 Hz, although higher and lower frequencies are also contemplated.

At block 510, the device 104 is configured to obtain a sensor dataset that will be employed in determining a pose of the device 104 in the facility coordinate system 112. The sensor dataset includes at least the location 400 of the device 104 in the local coordinates system 304, and may also include the orientation 404 of the device 104. As will be apparent, the location 400 (and orientation 404, when used) are obtained using the tracking sensor, e.g. the camera 212 and motion sensor 220. The sensor dataset also includes a proximity indicator, generated using the proximity sensor of the device 104 (e.g. the communications interface 216), and defining a range to a reference device, such as an AP 120. Further, the sensor dataset includes a predefined location of the reference device in the facility coordinate system 112. The predefined location of the reference device may be included in the signal from which the proximity indicator was derived. Alternatively, the signal from the reference device may contain a reference device identifier, and the predefined location may be retrieved from the memory 204 based on the reference device identifier.

Figure 6:
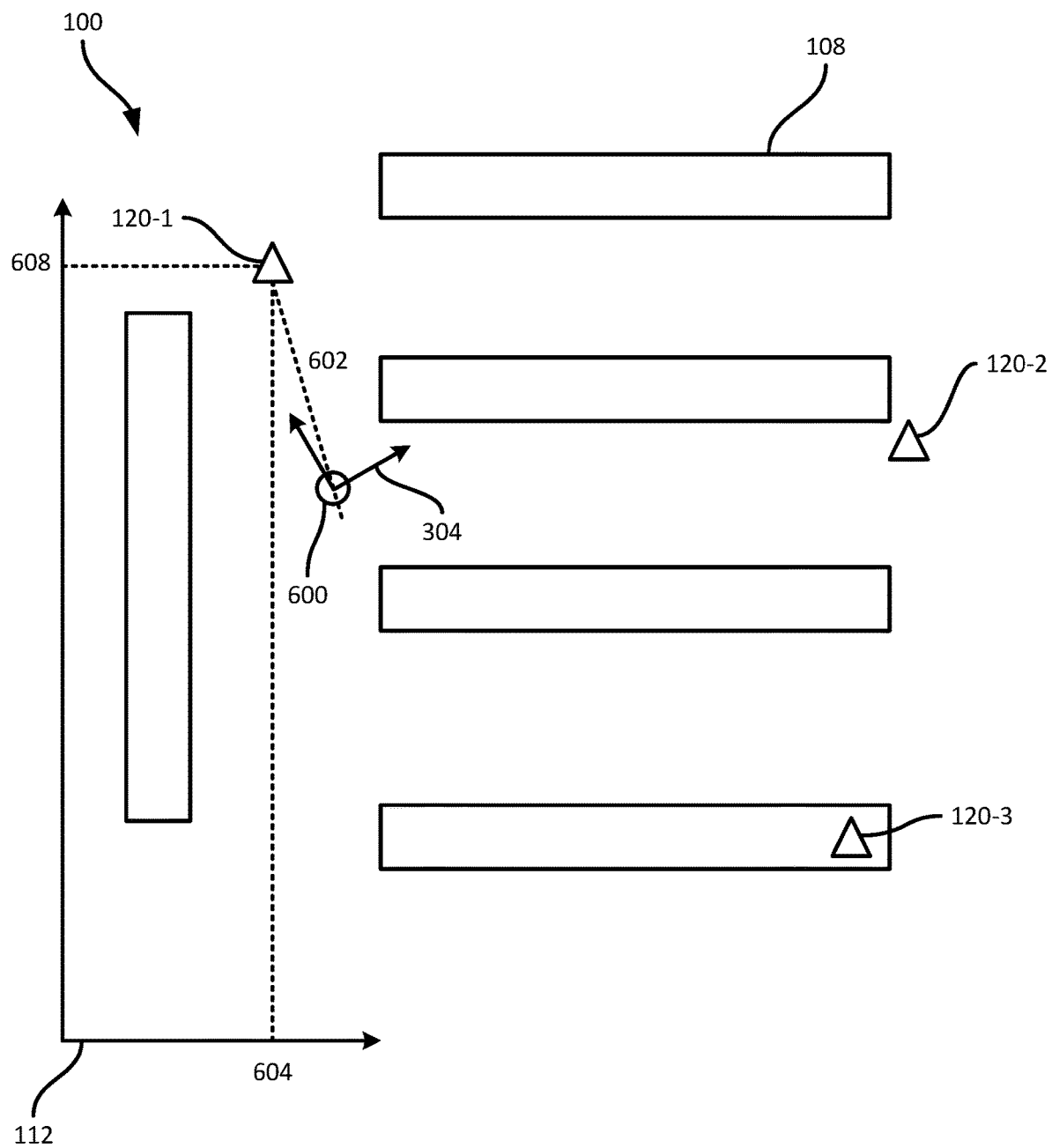
FIG. 6 is a diagram illustrating the collection of a sensor dataset at block 510 of the method of FIG. 5.

FIG. 6 illustrates a first sensor dataset, obtained upon initiation of pose tracking. In particular, the first sensor dataset includes a location 600 of the device 104, which in the illustrated example is at the origin of the local coordinate system 304. Of particular note, the transform between the local and facility coordinate systems 304 and 112 may not yet have been discovered. Nevertheless, for illustrative purposes it is assumed that the device location shown in FIG. 6 is also the true position of the device 104. The sensor dataset also includes a range 602, determined from a proximity indicator such as an RSSI derived from a signal emitted by the AP 120-1. The range 602, as shown in FIG. 6, is greater than the actual distance between the AP 120-1 and the device 104, e.g. because of the various sources of error involved in such range measurements, as noted earlier. The sensor dataset also includes a position of the AP 120-1 in the facility coordinate system, defined by coordinates 604 and 608.

Returning to FIG. 5, at block 515, the device 104 is configured to determine whether to adjust the origin of the local coordinate system 304 relative to the facility coordinate system 112. Such adjustment is performed using multiple sensor datasets, and aims to counteract sensor drift that may occur in the pose tracking initiated at block 505. The determination at block 515 can include, for example, whether a sequence of sensor datasets larger than a threshold number has been accumulated via successive performances of block 510. For example, the threshold may be five datasets, in this example. A wide variety of other thresholds may be applied in other examples, however. For example, in some examples the threshold can be one hundred datasets, although smaller and larger thresholds are also contemplated. If the tracking sensor (e.g. the camera 212 and motion sensor 220) loses track of the pose of the device 104, e.g. due to low light levels, severe motion, camera obscuration, etc., the processor 200 can trigger an immediate update of the pose estimation, regardless of the threshold above which is designed to accommodate slow drifts of the local position estimation process.

In this example, the determination at block 515 is negative, because only one dataset has been captured. The device 104 therefore skips blocks 520 and 525, and proceeds to block 530. At block 530, the device 104 uses the pose of the local origin in the facility coordinate system 112 to convert the location 400 (which is in the local coordinate system 304) into a location in the facility coordinate system 112. In this example, however, the pose of the local origin in the facility coordinate system 112 is not yet discovered, and block 530 may therefore be omitted, with the performance of the method 500 instead returning from block 515 to block 510.

Figure 7:
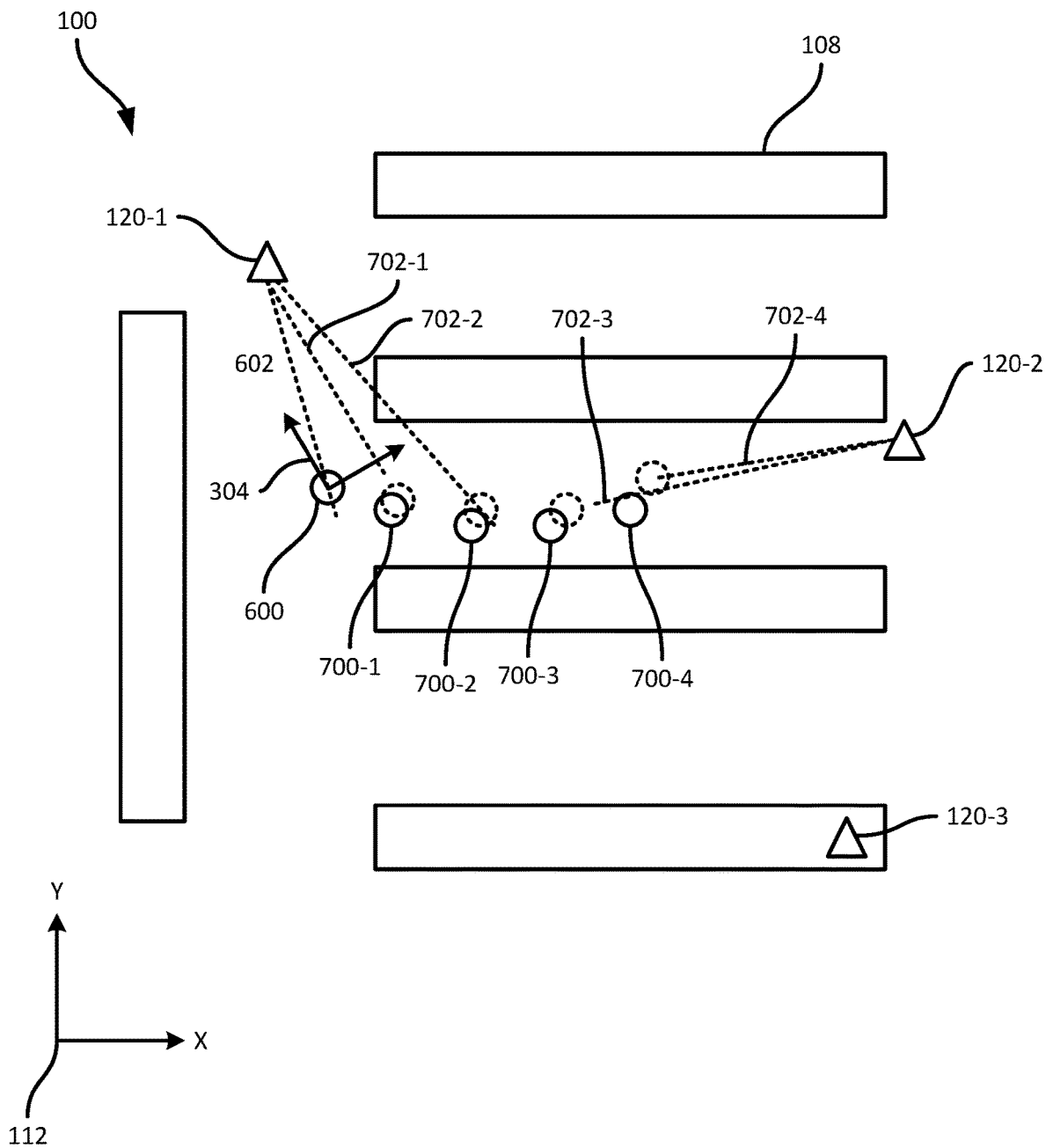
FIG. 7 is a diagram illustrating the collection of additional sensor datasets at block 510 of the method of FIG. 5.

In other words, block 510 is repeated until a sufficient number of datasets is available to adjust the pose of the origin of the local coordinate system 304 in the facility coordinate system 112. When the threshold number is reached, the determination at block 515 is affirmative, and the device 104 proceeds to block 520. FIG. 7 illustrates four further performances of block 510, for a total of five datasets. In FIG. 7, the true location of the device 104 is shown in dashed lines, and the measured location of the device 104 in the local coordinate system 304 is shown in solid lines, illustrating an increasing amount of drift over time. Each of the additional datasets includes a location 700 (specifically, locations 700-1, 700-2, 700-3, and 700-4) in the local coordinate system 304, as well as a range 702 (specifically, ranges 702-1, 702-2, 702-3, and 702-4) to an AP 120. As seen in FIG. 7, the ranges may be from different APs 120 as the device 104 moves through the facility 100. In some examples, the device 104 can be configured to retain only one range (e.g. the smallest range, corresponding to the greatest signal strength, shortest time-of-flight or the like), when multiple APs 120 are close enough to be detected. In other examples, each dataset can include multiple ranges and corresponding AP 120 locations in the facility coordinate system 112.

When the determination at block 515 is affirmative, at block 520 the device 104 selects a sequence of datasets, such as the preceding five datasets in this example (e.g. the current dataset, corresponding to the current location 700-4 and the five previous locations).

At block 525, the device 104 is configured to generate an adjusted pose of the origin of the local coordinate system 304, in the facility coordinate system 112. The generation of the adjusted pose at block 525 includes selecting parameters defining the origin of the local coordinate system 304 so as to minimize an error metric, as will be defined in greater detail below. The parameters selected are the parameters discussed in connection with FIG. 4 as defining the pose of the local origin. Specifically, the parameters selected at block 525 are the coordinates 420 and 424, as well as the angle 428.

Figure 8:
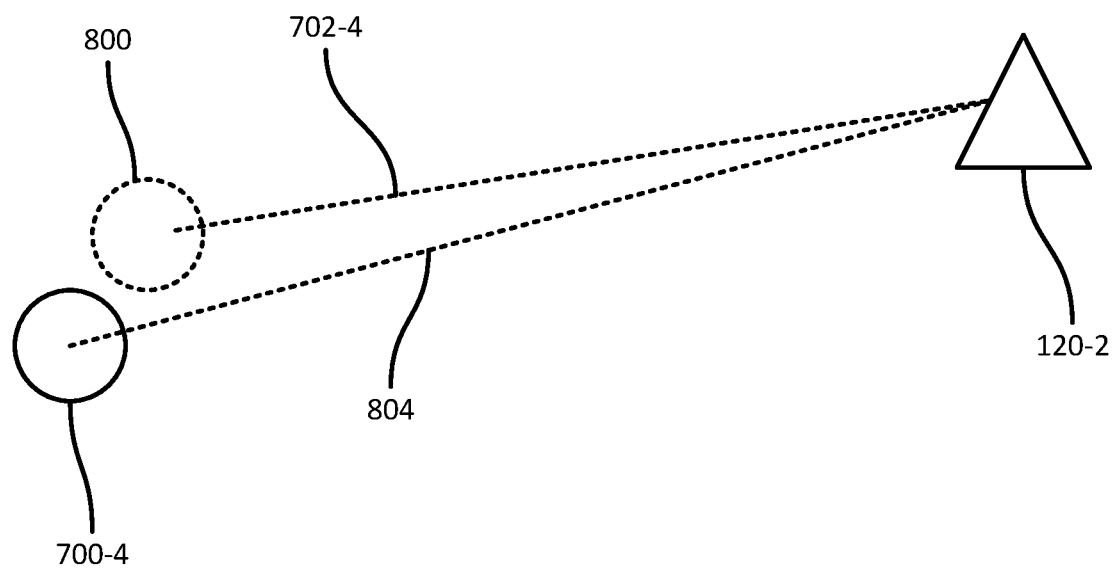
FIG. 8 is a diagram illustrating an error metric employed at block 525 of the method of FIG. 5.

The error metric noted above is a difference (i.e. an error) between the true range from an AP 120 or other reference device to the device 104, and a distance between the AP 120 and the device 104 calculated using the predefined location of the AP 120 and the location of the device 104, as determined using the location 400. FIG. 8 illustrates an example of the above-mentioned error.

FIG. 8 shows one dataset from FIG. 7 in isolation. In particular, the dataset includes the location 700-4, and a true position 800 of the device 104. The location 700-4 is initially determined in the local coordinate system 304, and its location in the facility coordinate system 112 may in fact not be known (e.g. if the transform between coordinate systems has not been discovered). However, it is assumed to be different from the true position of the device 104, e.g. due to sensor drift in the feature-based locationing technique. The range 702-4 is also shown between the AP 120-2 and the true location 800 of the device 104. Because the location 700-4 is inaccurate, a distance 804 between the location 700-4 and the AP 120-2 does not equal the range 702-4. The difference between the range 702-4 and the distance 804 is the above-mentioned error. As will be apparent, selecting the parameters 420, 424, and 428 may shift the local coordinate system 304 such that the location 700-4 is shifted closer to the true location 800, and the above error is reduced.

At block 525, the device 104 is therefore configured to determine which values for the parameters 420, 424, and 428 result in a minimization of the above error. Further, because the device 104 is solving for multiple parameters, and because the ranges 702 include noise-related inaccuracies, the device 104 does not use a single dataset, but rather a plurality of datasets. The noise-related errors in the ranges 702 are assumed to be random in nature, and may therefore be counteracted by making use of a number of samples.

Thus, the device 104 is configured to select values for the parameters 420, 424, and 428 that minimize the above error across all of the selected datasets from block 520. The error may be expressed as follows:

$$\text{error} = r - \sqrt{(x_o + x_l\cos\theta - y_l\sin\theta - x_{ap})^2 + (y_o + x_l\sin\theta + y_l\cos\theta - y_{ap})^2}$$

In the above, r is the range derived from a proximity indicator such as a signal strength (e.g. the range 702-4 shown in FIG. 8) or round trip time delay (RTT). The values "$x_0$" and "$y_0$" are the parameters 420 and 424, respectively. The angle theta is the parameter 428 mentioned above. The values "$x_1$" and "$y_1$" are the coordinates of the device 104 in the local coordinate system, and the values "$x_{ap}$" and "$y_{ap}$" are the coordinates of the relevant AP 120 in the facility coordinate system.

At block 525, the device 104 can be configured to solve a set of equations as presented above, one for each dataset, to select the values $x_0$, $y_0$, and $\theta$ that minimize the total combined error (e.g. the sum of the squares of the errors for each dataset). The parameters above may be selected by executing a suitable non-linear mean square error (MSE) solver, as will be apparent to those skilled in the art. In other examples, a filter, such as a Kalman filter, may be employed to select the parameters 420, 424, and 428 at block 525.

Figure 9:
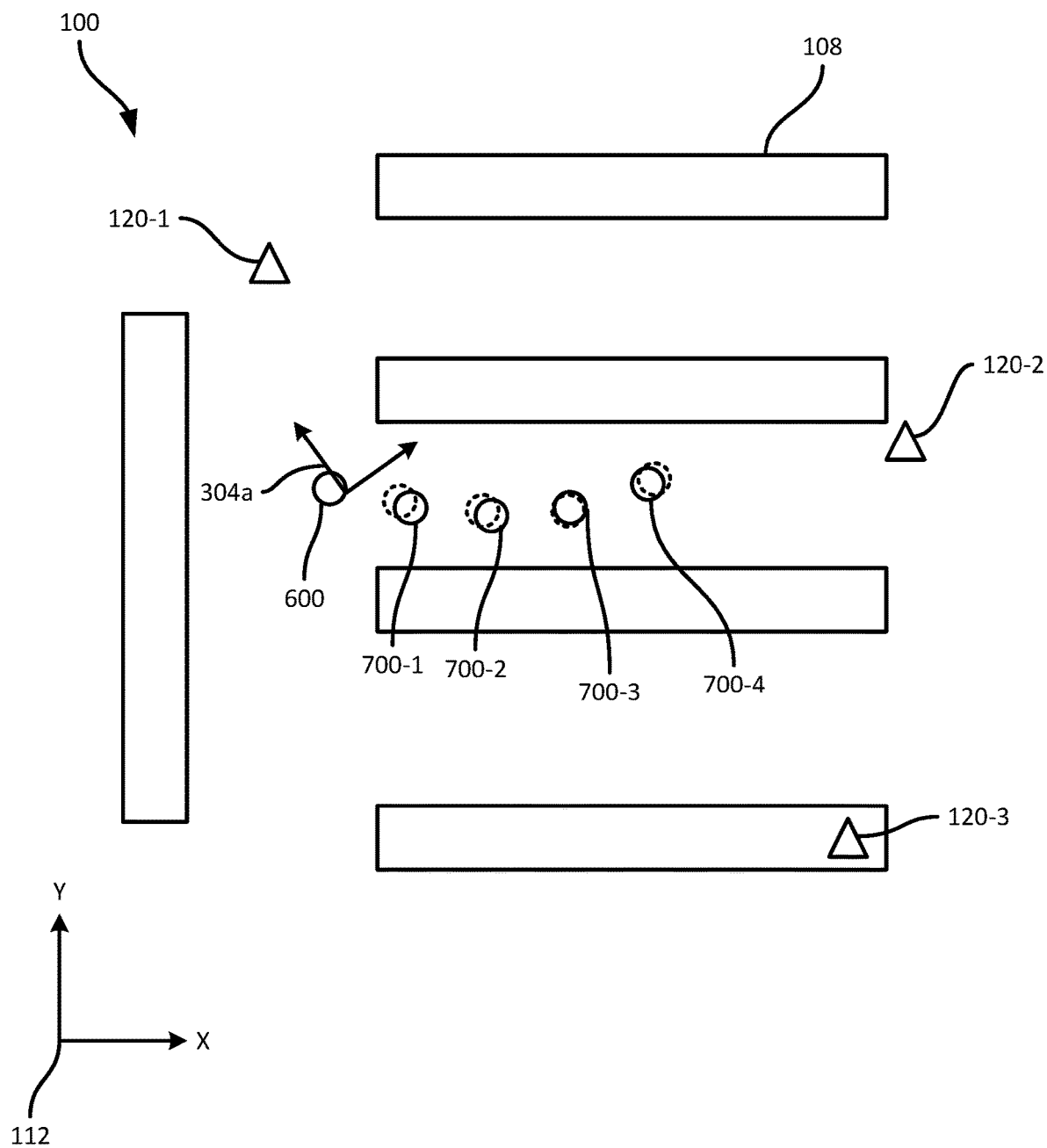
FIG. 9 is a diagram illustrating an example outcome of the performance of block 525 of the method of FIG. 5.

Turning to FIG. 9, an example outcome of a performance of block 525 is shown. In particular, the local coordinate system 304 has been replaced with an adjusted local coordinate system 304a, which has a different location and orientation in the facility coordinate system 112 (visible from the fact that the coordinate system 304a is no longer centered on the initial location 600). As a result of the adjustment of the local coordinate system 304, the locations 700-1, 700-2, 700-3, and 700-4 are closer to the true positions of the device 104 shown in dashed lines. Of particular note, the local coordinates of each dataset have not been altered. That is, the locations 700 are in the same positions as in FIG. 7, relative to the local coordinate system 304a. The adjustment of the origin of the local coordinate system 304a, however, results in adjustment of the locations 700 relative to the facility coordinate system 112 to more closely align with the true positions of the device 104, reducing the impact of sensor drift.

Returning to FIG. 5, at block 530 the device 104 is configured to generate a corrected location, using a current location 700 in the local coordinate system and the parameters 420, 424 and 428 selected at block 525. In other words, the local coordinates for the location 700-4, for example, are transformed to the facility coordinate system 112 using the parameters 420, 424, and 428 selected at block 525. At block 535, the device 104 can optionally select and execute a control action based on the corrected location. For example, the device 104 can present the corrected location on the display 214, e.g. along with updated directional guidance to another location in the facility 100, transmit the corrected location to the server 116, or the like.

The device 104 can then return to block 510. That is, the selection of new values for the parameters 420, 424, and 428 can be repeated periodically (including as frequently as with every new dataset once the threshold number of datasets mentioned above has been met). As a result, the origin of the local coordinate system 112 moves through the facility coordinate system 112 over time, to counteract the effect of sensor drift in the locations 700 obtained using the tracking sensor (e.g. the camera 212 and motion sensor 220).

As will be apparent to those skilled in the art, performance of the method 500 by the device 104 enables the device 104 to track its location using a feature-based technique that may enable greater update rates and less high-frequency noise than the proximity-based technique, while employing the proximity-based technique to correct for low-frequency error (e.g. drift) that may otherwise accumulate when using the feature-based locationing technique. The above combination may enable the device 104, in other words, to obtain greater locationing accuracy and consistency than via either technique in isolation.

Figure 10:
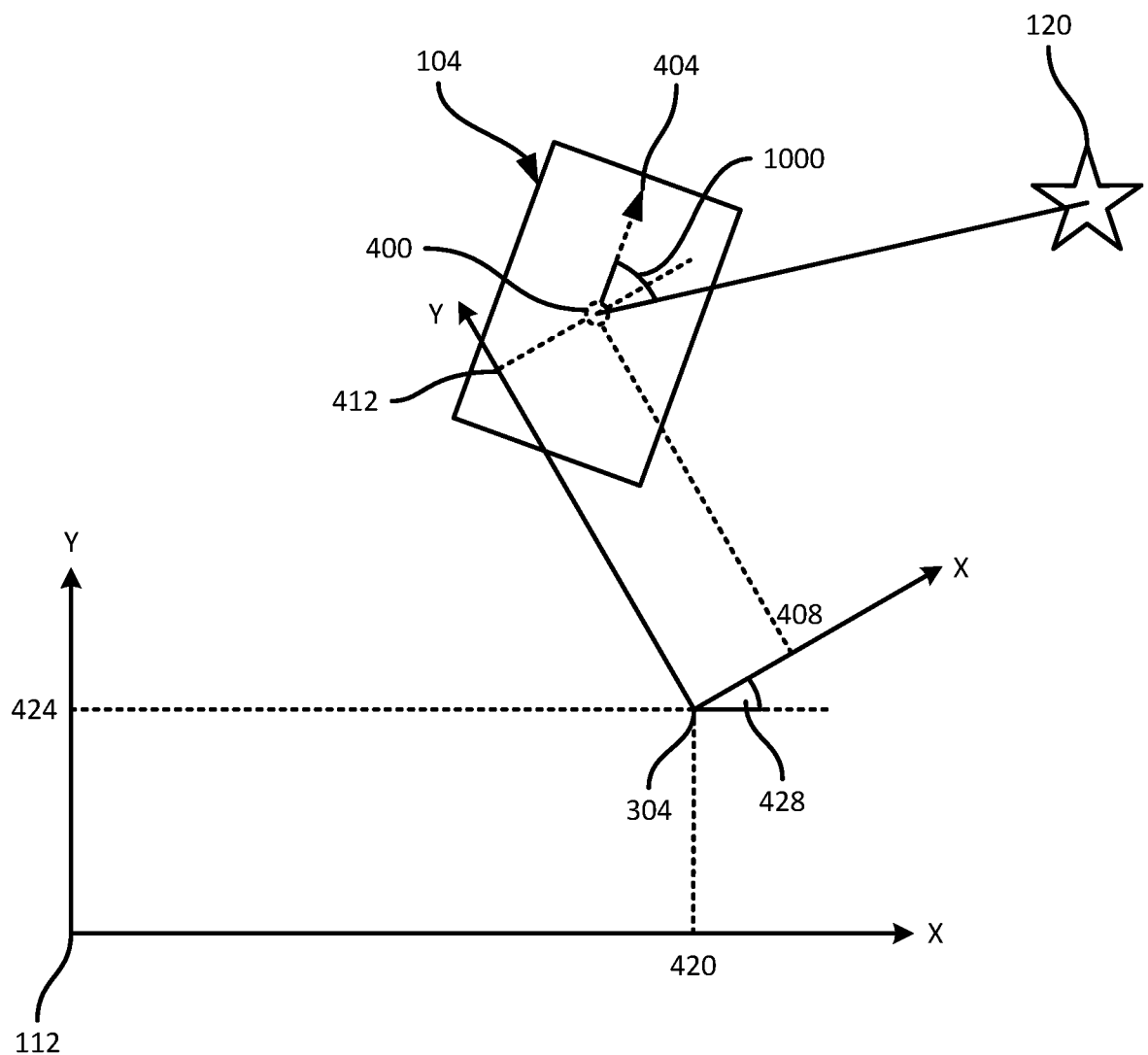
FIG. 10 is a diagram illustrating tracking of relative movement between the mobile device of FIGS. 1 and 2 and a fixed reference device.

In other implementations, the proximity indicators mentioned above can be supplemented with or replaced by other forms of proximity indicators, such as bearing angles from the device 104 to visual features in the facility 100 with predefined locations in the facility coordinate system 112. Such an implementation is detailed below, with reference to FIG. 10.

$$\text{error} = \alpha - a\tan 2((y_{apl} - y_l), (x_{apl} - x_l))$$

The error above is therefore a difference between the bearing angle perceived by the device 104 in the local coordinate system, and the true bearing angle between the device 104 and the reference device. In the above, the angle alpha is a bearing angle 1000 (shown in FIG. 10) between the device's heading (i.e. the orientation 404) and the reference device 120, in the local coordinate system. The arguments of the two-argument arctangent function include the values "$x_l$" and "$y_l$" which, as noted earlier, are the coordinates of the device 104 in the local coordinate system. The values "$y_{apl}$" and "$x_{apl}$" are the coordinates of the reference device in the local coordinate system. The device 104 may derive "$y_{apl}$" and "$x_{apl}$" as set out below.

$$x_{apl} = (x_{ap} - x_0)\cos\theta + (y_{ap} - y_0)\sin\theta$$

$$y_{apl} = (y_{ap} - y_0)\cos\theta + (x_{ap} - x_0)\sin\theta$$

The values "$x_{ap}$" and "$y_{ap}$" are the coordinates of the relevant AP 120 in the facility coordinate system, as noted earlier. The values "$x_0$" and "$y_0$" are the parameters 420 and 424, respectively. The angle theta is the parameter 428 mentioned previously. The device 104 is configured to solve a set of equations as presented above, one for each dataset, to select the values $x_0$, $y_0$, and $\theta$ that minimize the total combined error (e.g. the sum of the squares of the errors for each dataset).

The reference devices, in the above example, can include lights configured to emit specific identifying patterns, fiducial markers, or the like. In some examples, a reference device can combine an AP 120 with the above visual features (e.g. an AP can include a housing bearing a fiducial marker). As will be apparent, a reference device with visual features as mentioned above may be detected with the camera 212, rather than the communications interface 216. The camera 212, in other words, may therefore act as at least one of, and potentially both of, the tracking sensor and the proximity sensor.

In further implementations, at block 520 the device 104 can be configured to omit from the selected datasets and datasets with ranges 702 that deviate from preceding or following ranges 702 (e.g. based on signals from the same AP 120) by more than a threshold. Such a deviation may indicate the presence of a multi-path artifact or other error that is sufficiently large to disqualify the dataset from use at block 525.

In some deployments, reference devices such as the APs 120 may not have been installed with locationing as described above in mind. For example, the APs 120 may have been installed in the facility to provide network coverage, which may require less accurate knowledge of the facility coordinates of the APs 120 than is necessary for use in the method 500. The device 104 can therefore also be configured to perform a surveying process, prior to performing the method 500, to determine the locations of APs 120 with sufficient accuracy for use in the method 500.

Figure 11:
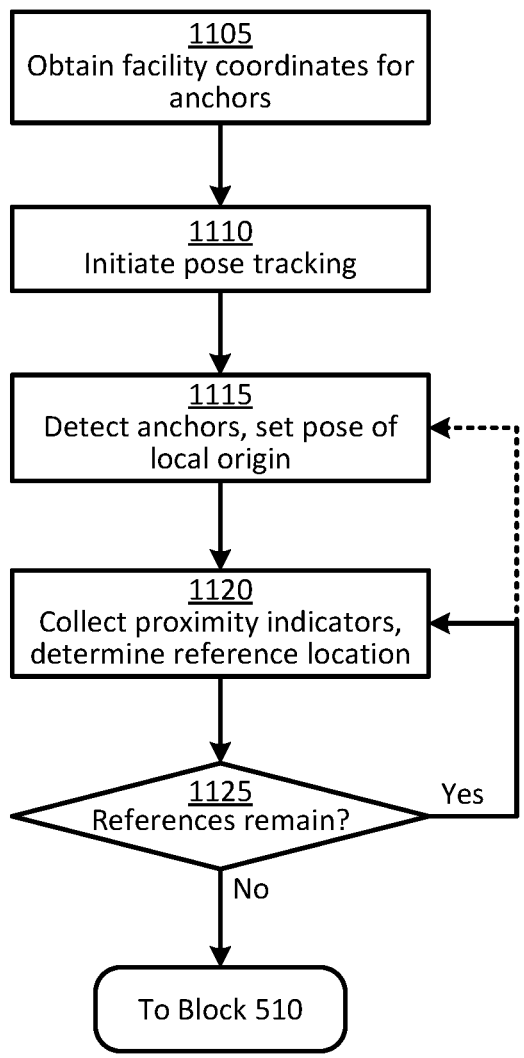
FIG. 11 is a flowchart of a survey method.

In particular, referring to FIG. 11, a survey method 1100 is illustrated, which can be performed by the device 104 prior to performance of the method 500. In particular, at block 1105, the device 104 is configured to obtain coordinates, in the facility coordinate system 112, of at least two anchor features in the facility. The anchor features are detectable by the tracking sensor, and can therefore include features detectable by the camera 212, such as a corner of a support structure (e.g. a shelf), or the like. The coordinates obtained at block 1105 are measured, in the facility coordinate system 112, prior to performance of the method 1100, and can then be stored in the memory 204 or otherwise made available to the device 104.

Figure 12:
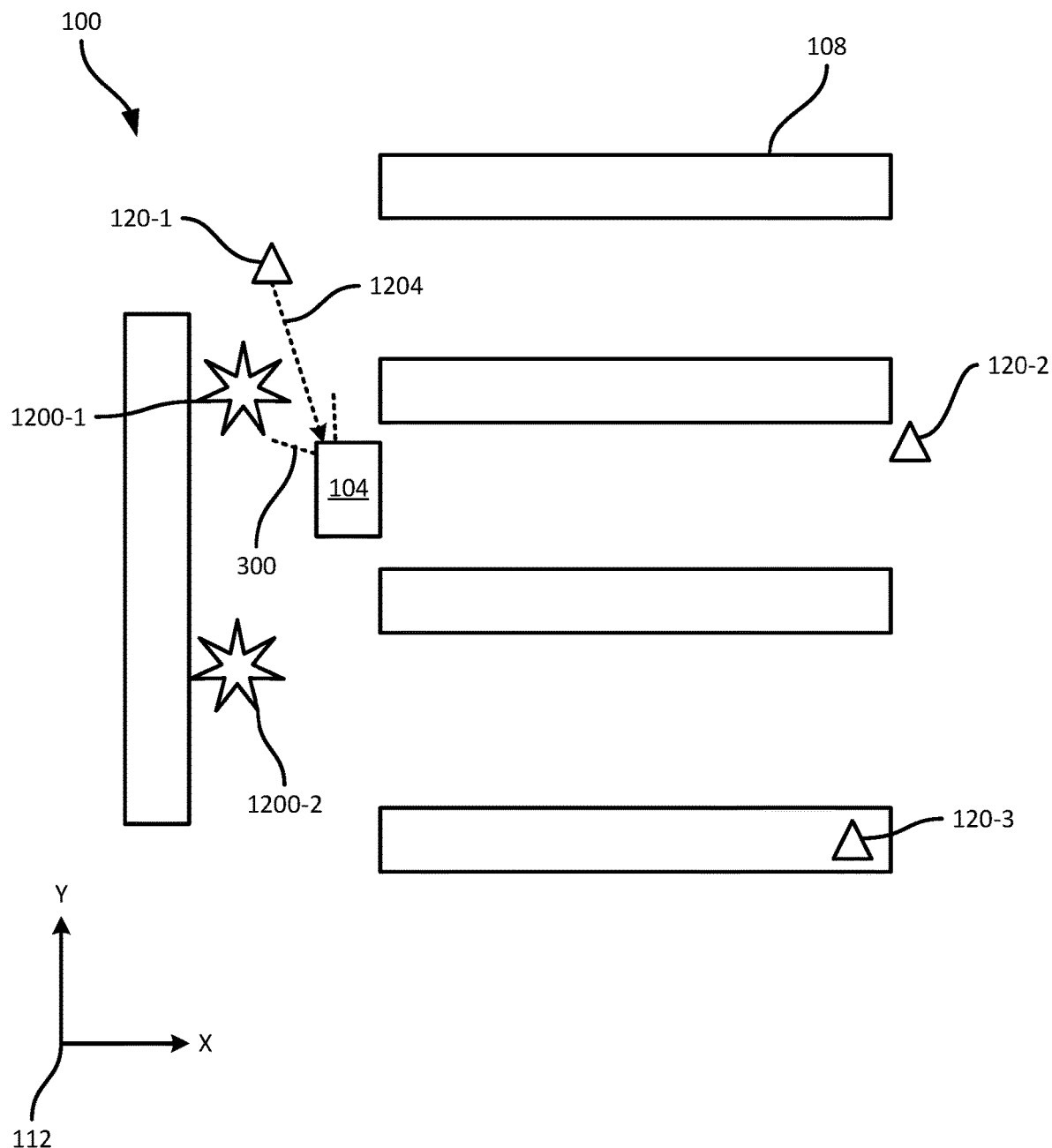
FIG. 12 is a diagram illustrating the deployment of anchors for use in the method of FIG. 11.

At block 1110, the device 104 is configured to initiate pose tracking, as described above in connection with block 505. At block 1115, the device 104 is configured to detect the anchors mentioned above, and to determine the pose of the local coordinate system 304, based on the local pose of the device 104 at the time(s) the anchors are detected, and the previously measured facility coordinates of the anchors. For example, referring to FIG. 12, anchors 1200-1 and 1200-2 are shown at predefined locations in the facility, and whose coordinates in the facility coordinate system 112 are obtained by the device 104 at block 1105. The device 104 is configured to use the facility coordinates of the anchors 1200, as well as corresponding device positions in the local coordinate system 304, to determine the pose of the local coordinate system 304 in the facility coordinate system 112, for example as follows:

$$x_0 = (x_{a1} - x_{a1L})$$

$$y_0 = (y_{a1} - y_{a1L})$$

$$\theta = \arctan 2(y_{a2L} - y_{a1L}), (x_{a2L} - x_{a1L}))$$

In the above expressions, $x_0$ and $y_0$ are the parameters 420 and 424. The "a1" values (x and y) represent the coordinates of the first anchor 1200-1 in the facility coordinate system 112. The "a1L" values (x and y) represent the coordinates of the first anchor 1200-1 in the local coordinate system 304. The "a2L" values represent the coordinates of the second anchor 1200-2 in the local coordinate system. The angle theta is the parameter 428. From the above, the coordinates of the device 104 in the facility coordinate system 112 can be determined.

Returning to FIG. 11, at block 1120, the device 104 is configured to detect a plurality of proximity indicators for at least one of the APs 120. As noted above, the proximity indicators can be RSSI values, e.g. an RSSI value determined from a signal 1204 (see FIG. 12) detected at the device 104 from the AP 120-1. The proximity indicators can be collected as the device 104 travels through the facility. Having collected at least a predetermined number of proximity indicators for a given AP 120, the device 104 is configured to determine the location of that AP 120 in the facility coordinate system 112. For example, the device 104 can solve for values of the AP coordinates that minimize an error between the range from the device 104 to the AP 120 as determined from the proximity indicators, and the distance from the device 104 to the AP 120 as determined from the facility coordinates of the device and the coordinates of the AP 120 itself (which are not yet known). In other words, the device 104 can be configured to solve a plurality of expressions as set out below, one for each proximity indicator and corresponding device coordinates (in the facility coordinate system 112)

$$\text{error} = r - \sqrt{(x_d - x_{ap})^2 \times (y_d - y_{ap})^2}$$

In the above expression, r is the range derived from a proximity indicator such as a signal strength or round trip time delay (RTT). The values "$x_d$" and "$y_d$" are the coordinates of the device 104 in the facility frame of reference 112, and the values "$x_{ap}$" and "$y_{ap}$" are the coordinates of the relevant AP 120 in the facility coordinate system 112, which are to be solved for. Having solved for AP coordinates that minimize the error above, the device 104 can store the AP coordinates for later use in the method 500. In some examples, the device 104 can determine whether the sum of the error from each proximity indicator used to derive the AP coordinates is below a threshold, before storing the AP coordinates for later use.

At block 1125, the device 104 is configured to determine whether further APs 120 remain to be located. When the determination at block 1125 is affirmative, the device 104 returns to block 1120, to continue traveling the facility and collecting proximity indicators (e.g. ignoring those of the AP 120 that has been successfully surveyed). In some examples, the device 104 can also periodically return to the anchors 1200 to update the pose of the local frame of reference 304 in order to avoid accumulating sensor drift. When the determination at block 1125 is negative, the method 1100 ends.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
   a tracking sensor;
   a proximity sensor; and
   a controller coupled to the tracking sensor and the proximity sensor, the controller configured to:
      obtain a sequence of sensor datasets, each sensor dataset including:
         (i) a location of the mobile computing device, in a local coordinate system, generated using the tracking sensor,
         (ii) a proximity indicator generated using the proximity sensor, defining at least one of a range or a bearing angle to a fixed reference device, and
         (iii) an identifier indicative of a predefined location of the reference device in a facility coordinate system;
      determine, from the sequence, an adjusted pose of an origin of the local coordinate system in the facility coordinate system; and
      generate, using a current location of the mobile device in the local coordinate system and the adjusted pose, a corrected location of the mobile computing device in the facility coordinate system; and
      execute a control action based on the corrected location.

2. The mobile computing device of claim 1, wherein the controller is configured to obtain the sequence of sensor datasets by selecting a current dataset and a predefined number of preceding datasets.

3. The mobile computing device of claim 1, wherein the reference device is a wireless emitter; and wherein the proximity indicator includes at least one of: a signal strength indicator associated with the wireless emitter, a round trip time (RTT), or a range estimate.

4. The mobile computing device of claim 3, wherein the reference device is at least one of: a wireless communications access point, a wireless beacon, or a visual feature affixed to a surface in the facility.

5. The mobile computing device of claim 1, wherein the controller is further configured, to determine the adjusted pose of the origin of the local coordinate system, to: select parameters defining the adjusted pose in order to minimize an error metric.

6. The mobile computing device of claim 5, wherein the error metric includes a combination of error measurements for each sensor dataset, each error measurement defining a difference between (i) the range defined by the proximity indicator, and (ii) a distance to the reference device defined by the location of the mobile computing device in the local coordinate system and the adjusted pose.

7. The mobile computing device of claim 5, wherein the error metric includes a combination of error measurements for each sensor dataset, each error measurement defining a difference between (i) a perceived bearing angle between the mobile computing device and the reference device, and (ii) a true bearing angle between the mobile computing device and the reference device.

8. The mobile computing device of claim 1, wherein the controller is configured to periodically repeat the obtaining of a sequence of datasets, and the determination of the adjusted pose.

9. The mobile computing device of claim 1, wherein the control action includes transmission of the corrected location via a network.

10. The mobile computing device of claim 1, wherein the tracking sensor includes at least one of an inertial measurement unit, or a camera.

11. The mobile computing device of claim 1, wherein the controller is further configured, prior to obtaining the sequence of sensor datasets, to:
   obtain predefined positions, in the facility coordinate system, of at least a pair of anchors;
   responsive to detection of the anchors using the tracking sensor, determine an initial pose of the origin of the local coordinate system based on the predefined positions and corresponding locations of the mobile computing device in the local coordinate system;
   collect a sequence of proximity indicators from one of the reference devices; and
   determine the predefined location of the reference device in the facility coordinate system based on the sequence of proximity indicators and the initial pose.

12. A method, comprising:
   obtaining a sequence of sensor datasets at a mobile computing device having a tracking sensor and a proximity sensor, each sensor dataset including:
      (i) a location of the mobile computing device, in a local coordinate system, generated using the tracking sensor,
      (ii) a proximity indicator generated using the proximity sensor, defining at least one of a range or a bearing angle to a fixed reference device, and
      (iii) an identifier indicative of a predefined location of the reference device in a facility coordinate system;
   determining, from the sequence, an adjusted pose of an origin of the local coordinate system in the facility coordinate system; and
   generating, using a current location of the mobile device in the local coordinate system and the adjusted pose, a corrected location of the mobile computing device in the facility coordinate system; and
   executing a control action based on the corrected location.

13. The method of claim 12, wherein obtaining the sequence of sensor datasets includes selecting a current dataset and a predefined number of preceding datasets.

14. The method of claim 12, wherein the reference device is a wireless emitter; and wherein the proximity indicator includes at least one of: a signal strength indicator associated with the wireless emitter, a round trip time (RTT), or a range estimate.

15. The method of claim 14, wherein the reference device is at least one of: a wireless communications access point, a wireless beacon, or a visual feature affixed to a surface in the facility.

16. The method of claim 12, wherein determining the adjusted pose of the origin of the local coordinate system includes selecting parameters defining the adjusted pose in order to minimize an error metric.

17. The method of claim 16, wherein the error metric includes a combination of error measurements for each sensor dataset, each error measurement defining a difference between (i) the range defined by the proximity indicator, and (ii) a distance to the reference device defined by the location of the mobile computing device in the local coordinate system and the adjusted pose.

18. The method of claim 12, further comprising periodically repeating the obtaining of a sequence of datasets, and the determination of the adjusted pose.

19. The method of claim 12, wherein the control action includes transmission of the corrected location via a network.

20. The method of claim 12, wherein the tracking sensor includes at least one of an inertial measurement unit, or a camera.

21. The method of claim 12, further comprising, prior to obtaining the sequence of sensor datasets:
- obtaining predefined positions, in the facility coordinate system, of at least a pair of anchors;
- responsive to detection of the anchors using the tracking sensor, determining an initial pose of the origin of the local coordinate system based on the predefined positions and corresponding locations of the mobile computing device in the local coordinate system;
- collecting a sequence of proximity indicators from one of the reference devices; and
- determining the predefined location of the reference device in the facility coordinate system based on the sequence of proximity indicators and the initial pose.

22. A non-transitory computer-readable medium storing instructions executable by a controller of a mobile device having a tracking sensor and a proximity sensor, execution of the instructions causing the controller to:
- obtain a sequence of sensor datasets, each sensor dataset including:
  - (i) a location of the mobile computing device, in a local coordinate system, generated using the tracking sensor,
  - (ii) a proximity indicator generated using the proximity sensor, defining at least one of a range or a bearing angle to a fixed reference device, and
  - (iii) an identifier indicative of a predefined location of the reference device in a facility coordinate system;
- determine, from the sequence, an adjusted pose of an origin of the local coordinate system in the facility coordinate system; and
- generate, using a current location of the mobile device in the local coordinate system and the adjusted pose, a corrected location of the mobile computing device in the facility coordinate system; and
- execute a control action based on the corrected location.

* * * * *